US009812898B2

(12) United States Patent
Spivey et al.

(10) Patent No.: US 9,812,898 B2
(45) Date of Patent: Nov. 7, 2017

(54) BACKUP POWER SOURCE FOR PROVIDING A FAIL-SAFE ACTUATION OF AN ELECTRIC ACTUATOR

(71) Applicants: Christopher W. Spivey, Tucker, GA (US); Kirk S. Hegwood, Chamblee, GA (US)

(72) Inventors: Christopher W. Spivey, Tucker, GA (US); Kirk S. Hegwood, Chamblee, GA (US)

( * ) Notice: Subject to any disclaimer, the term of this patent is extended or adjusted under 35 U.S.C. 154(b) by 635 days.

(21) Appl. No.: 14/082,417

(22) Filed: Nov. 18, 2013

(65) Prior Publication Data
US 2015/0137605 A1 May 21, 2015

(51) Int. Cl.
*H02J 9/06* (2006.01)
(52) U.S. Cl.
CPC ........... *H02J 9/061* (2013.01); *Y10T 307/625* (2015.04)
(58) Field of Classification Search
CPC .............................. H02J 9/061; Y10T 307/625
See application file for complete search history.

(56) References Cited

U.S. PATENT DOCUMENTS

| 5,278,454 A * | 1/1994 | Strauss | H02J 9/061 307/64 |
| 7,567,060 B1* | 7/2009 | Atcitty | G01R 31/40 307/64 |
| 8,138,625 B2* | 3/2012 | Duan | G06F 11/2015 307/11 |
| 8,138,706 B2* | 3/2012 | Ochsenbein | H02J 7/0016 318/400.3 |
| 2006/0221516 A1* | 10/2006 | Daboussi | H02J 7/0016 361/18 |
| 2007/0035255 A1* | 2/2007 | Shuster | G08B 7/06 315/200 R |
| 2007/0228835 A1* | 10/2007 | Varzhabedian | H02J 7/027 307/66 |
| 2008/0150451 A1* | 6/2008 | Gordin | H05B 41/231 315/307 |
| 2010/0007301 A1* | 1/2010 | Ochsenbein | H02J 7/0016 318/563 |
| 2012/0299381 A1* | 11/2012 | Larson | H02J 9/06 307/60 |
| 2015/0015089 A1* | 1/2015 | Le | H01H 47/004 307/125 |
| 2015/0088384 A1* | 3/2015 | Darraba | H02P 29/025 701/45 |

* cited by examiner

*Primary Examiner* — Jared Fureman
*Assistant Examiner* — Emmanuel R Dominique
(74) *Attorney, Agent, or Firm* — Charles E. Baxley

(57) ABSTRACT

A capacitive-based system that provides an electrical backup power source to an electric actuator for fail-safe actuation. The capacitive-based system includes an input power supply, a plurality of supercapacitors, and an output power supply. The input power supply converts an AC or DC primary power to a regulated DC output. The plurality of supercapacitors are connected in series to form a bank of supercapacitors. The bank of supercapacitors are operatively connected to the input power supply, are charged to a bank voltage set by the regulated DC output of the input power supply, and are used to store the electrical backup power source. The output power supply is operatively connected to the bank of supercapacitors, and boosts the bank voltage of the bank of supercapacitors to a higher DC output voltage, i.e., the electrical backup power source, that supplies the electric actuator.

31 Claims, 3 Drawing Sheets

BACKUP POWER SOURCE FOR PROVIDING A FAIL-SAFE ACTUATION OF AN ELECTRIC ACTUATOR

1. CROSS REFERENCE TO RELATED APPLICATIONS

The instant non-provisional patent application claims priority from provisional patent application No. 61/854,550, filed on Apr. 26, 2013, and entitled SYSTEM AND METHOD TO PROVIDE A BACKUP POWER SOURCE TO ELECTRIC ACTUATORS FOR FAIL-SAFE ACTUATION.

2. BACKGROUND OF THE INVENTION

A. Field of the Invention

The embodiments of the present invention relate to a backup power source, and more particularly, the embodiments of the present invention relate to a capacitive-based system for providing an electrical backup power source for an electric actuator for fiil-safe actuation.

B. Description of the Prior Art (a) Electric Actuators.

Electric actuators are used in many industries including refining, process, water, waste-water, HVAC, and more. Electric actuators are used to electromechanically operate valves, dampers, gear boxes, and other apparatus to predetermined positions.

With a loss of primary power to an electric actuator, operating the apparatus to a fail-safe position is not possible without a backup power source. Conventional backup power sources for electric actuators include battery-based electrical backup power systems, hydraulic or pneumatic backup power systems, and mechanical backup power systems utilizing springs.

(b) Battery-based Electrical Backup Power Systems.

Battery-based electrical backup power systems are problematic due to their weight, complex maintenance, limited temperature range, and hazardous materials inherent to batteries and the disposal thereof.

(c) Hydraulic or Pneumatic Backup Power Systems.

Hydraulic or pneumatic backup power systems must be attached to the electric actuator, are physically large and heavy, have a restrictive temperature range, and in the case of pneumatics have a restrictive power range.

(d) Mechanical Backup Power Systems.

Mechanical backup power systems consisting of wound springs must be attached to the actuator, have limited torque, require larger actuators to tighten the spring, and have a limited operational range.

3. SUMMARY OF THE INVENTION

Thus, an object of the embodiments of the present invention is to provide a capacitive-based system for providing an electrical backup power source for an electric actuator for fail-safe actuation, which avoids the disadvantages of the prior art.

Briefly stated, another object of the embodiments of the present invention is to provide a capacitive-based system that provides an electrical backup power source to an electric actuator for fail-safe actuation, wherein the electric actuator has an input supply. The capacitive-based system includes an input power supply, a plurality of supercapacitors, and an output power supply. The input power supply converts an AC or DC primary power to a regulated DC output. The plurality of supercapacitors are connected in series to form a bank of supercapacitors. The bank of supercapacitors are operatively connected to the input power supply, are charged to a bank voltage set by the regulated DC output of the input power supply, and are used to store the electrical backup power source. The output power supply is operatively connected to the bank of supercapacitors, and boosts the bank voltage of the bank of supercapacitors to a higher DC output voltage, i.e., the electrical backup power source. The higher DC output voltage, i.e., the electrical backup power source, supplies the input supply of the electric actuator.

The novel features considered characteristic of the embodiments of the present invention are set forth in the appended claims. The embodiments of the present invention themselves, however, both as to their construction and to their method of operation together with additional objects and advantages thereof will be best understood from the following description of the embodiments of the present invention when read and understood in connection with the accompanying figures of the drawing.

4. BRIEF DESCRIPTION OF THE FIGURES OF THE DRAWING

The figures of the drawing are briefly described as follows.

5. LIST OF REFERENCE NUMERALS UTILIZED IN THE FIGURES OF THE DRAWING

Figure 1:
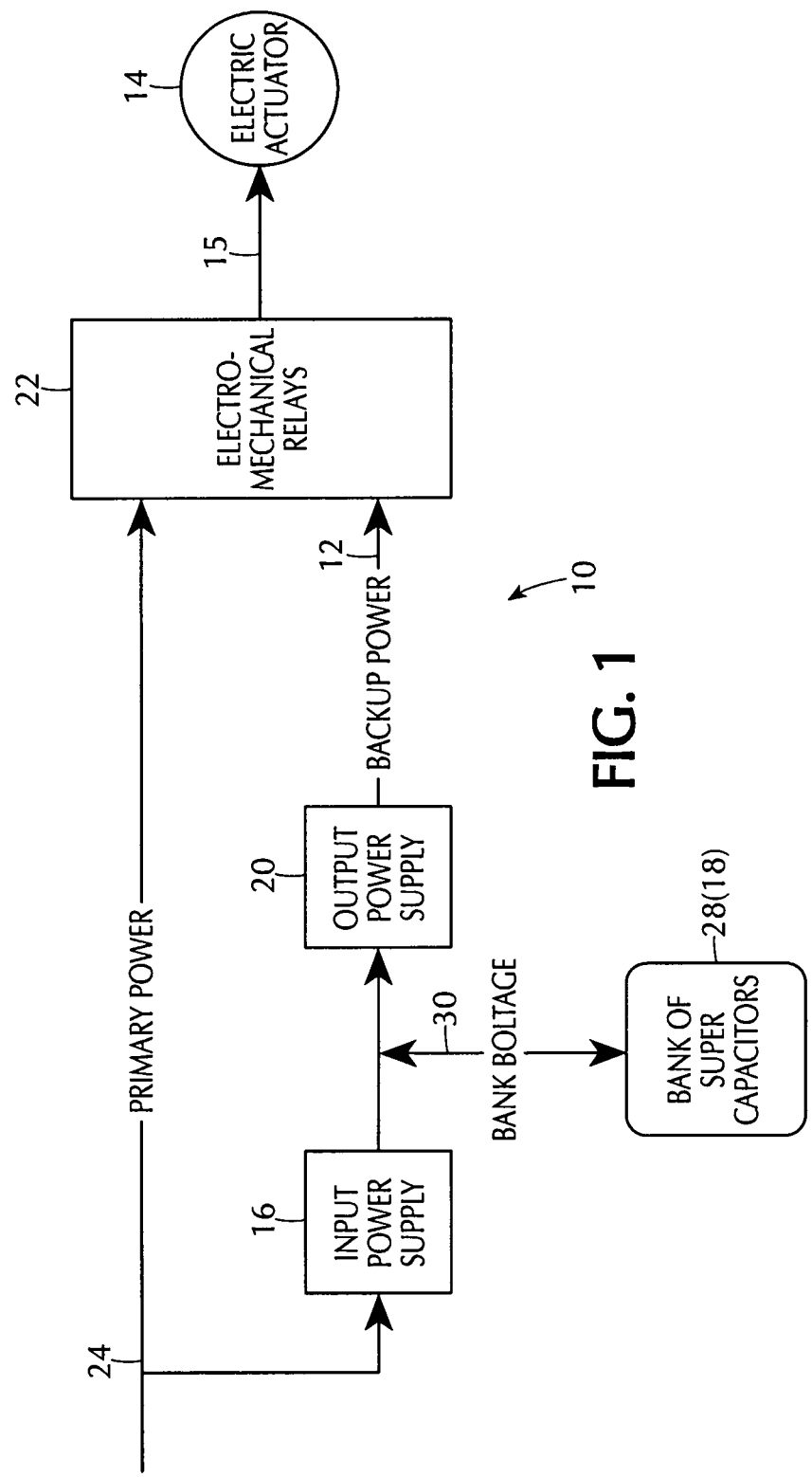
FIG. 1 is a diagrammatic block diagram of the capacitive-based system of the embodiments of the present invention providing an electrical backup power source to an electric actuator for fail-safe actuation.

A. Introductory.
10 capacitive-based system of embodiments of present invention for providing electrical backup power source 12 for electric actuator 14 for fail-safe actuation
12 electrical backup power source for electric actuator 14 for fail-safe actuation
14 electric actuator
15 input supply of electric actuator 14
 B. Overall Configuration of Capacitive-Based System 10.
16 input power supply for converting AC or DC primary power 24 to regulated DC output
18 plurality of supercapacitors
20 output power supply
22 plurality of electromechanical relays
24 AC or DC primary power
28 bank of supercapacitors
30 bank voltage of bank of supercapacitors 28
 (1) Specific Configuration of Input Power Supply 16.
 None
 (2) Specific Configuration of Bank of Supercapacitors 28.
34 supercapacitor C1 of plurality of supercapacitors 18
36 supercapacitor C2 of plurality of supercapacitors 18
38 supercapacitor C3 of plurality of supercapacitors 18

40 supercapacitor C4 of plurality of supercapacitors 18
42 supercapacitor C5 of plurality of supercapacitors 18
44 supercapacitor C6 of plurality of supercapacitors 18
46 supercapacitor C7 of plurality of supercapacitors 18
48 supercapacitor C8 of plurality of supercapacitors 18
50 supercapacitor C9 of plurality of supercapacitors 18
52 supercapacitor C10 of plurality of supercapacitors 18
54 supercapacitor C11 of plurality of supercapacitors 18
56 supercapacitor C12 of plurality of supercapacitors 18
58 resistor R1
60 resistor R2
62 resistor R3
64 resistor R4
66 resistor R5
68 resistor R6
70 resistor R7
72 resistor R8
74 resistor R9
76 resistor R10
78 resistor R11
80 resistor R12
82 positive terminal
84 negative terminal
   (3) Specific Configuration of Output Power Supply 20. None
   (4) Specific Configuration of Plurality of Electromechanical Relays 22.
86 first relay
88 second relay
90 positive primary power
92 negative primary power
96 normally-open contact
98 normally-open contact
100 normally-open contact
102 normally-open contact
104 positive input power of electric actuator 14
106 negative input power of electric actuator 14
110 normally-open contact
112 normally-open contact
114 normally-open contact
118 remote open position signal
120 remote close position signal
124 position open signal of electric actuator 14
126 position close signal of electric actuator 14
128 position reference signal of electric actuator 14
130 normally-closed contact
132 normally-closed contact
134 normally-closed contact
136 normally-closed contact
138 positive backup power
140 negative backup power
142 normally-closed contact
144 normally-closed contact
146 normally-closed contact
150 fail-safe open signal
152 fail-safe close signal
154 single pole double throw fail-safe position switch

6. DETAILED DESCRIPTION OF THE PREFERRED EMBODIMENTS

A. Introductory.

Referring now to the figures, in which like numerals indicate like parts, and particularly to FIG. 1, which is a diagrammatic block diagram of the capacitive-based system of the embodiments of the present invention providing an electrical backup power source to an electric actuator for fail-safe actuation, the capacitive-based system of the embodiments of the present invention is shown generally at 10 for providing an electrical backup power source 12 for an electric actuator 14 for fail-safe actuation, wherein the electric actuator 14 has an input supply 15.

B. Overall Configuration of the Capacitive-Based System 10.

The overall configuration of the capacitive-based system 10 can best be seen in FIG. 1, which is, again, a diagrammatic block diagram of the capacitive-based system of the embodiments of the present invention providing an electrical backup power source to an electric actuator for fail-safe actuation, and as such, will be discussed with reference thereto.

The capacitive-based system 10 comprises an input power supply 16, a plurality of supercapacitors 18, an output power supply 20, and a plurality of electromechanical relays 22.

The input power supply 16 is for converting an AC or DC primary power 24 to a regulated DC output.

The plurality of supercapacitors 18 are connected in series to form a bank of supercapacitors 28. The bank of supercapacitors 28 are operatively connected to the input power supply 16, are charged to a bank voltage 30 set by the regulated DC output of the input power supply 16, and are used to store the electrical backup power source 12.

The output power supply 20 is operatively connected to the bank of supercapacitors 28, and boosts the bank voltage 30 of the bank of supercapacitors 28 to a higher DC output voltage, i.e., the electrical backup power source 12.

The plurality of electromechanical relays 22 are operatively connected to the output power supply 20, are used to switch the input supply 15 of the electric actuator 14 between the AC or DC primary power 24 and the electrical backup power source 12, and sense a loss of the AC or DC primary power 24 to trigger the capacitive-based system 10 to power the electric actuator 14 to a fail-safe position.

(1) Specific Configuration of the Input Power Supply 16.

The specific configuration of the input power supply 16 can best be seen in FIG. 1, which is, again, a diagrammatic block diagram of the capacitive-based system of the embodiments of the present invention providing an electrical backup power source to an electric actuator for fail-safe actuation, and as such, will be discussed with reference thereto.

The input power supply 16 is a commercial-off-the-shelf (COTS) device.

The input power supply 16 is selected based on a type of the AC or DC primary power 24 available to the capacitive-based system 10, and can be one of two types, namely, an AC to DC converter or a DC to DC converter.

The AC or DC primary power 24 is either a single phase 120-240 VAC 50/60 Hz input or a 24 VDC input.

If the AC or DC primary power 24 is the single phase 120-240 VAC 50/60 Hz input, the input power supply 16 selected is an AC to DC converter having an input voltage range wide enough to span an expected voltage range available from the AC or DC primary power 24.

If the AC or DC primary power 24 is the 24 VDC input, the input power supply 16 selected is a DC to DC converter having an input voltage range wide enough to span the expected voltage range available from the AC or DC primary power 24.

In both cases, an output of the input power supply 16 is a regulated DC output whose voltage level is set to fall within an input voltage range of the output power supply 20, but not to exceed a maximum voltage level of the bank of supercapacitors 28.

The bank voltage 30 of the bank of supercapacitors 28 is set at 24 VDC, although others are possible based on an adjustable output range of the input power supply 16. The bank voltage 30 of the bank of supercapacitors 28 is set as close as possible to a maximum input voltage of the output power supply 20 without exceeding the maximum voltage level of the bank of supercapacitors 28.

When the AC or DC primary power 24 is applied, the input power supply 16 charges the bank of supercapacitors 28 up to the bank voltage 30 of the bank of supercapacitors 28.

(2) Specific Configuration of the Bank of Supercapacitors 28.

Figure 2:
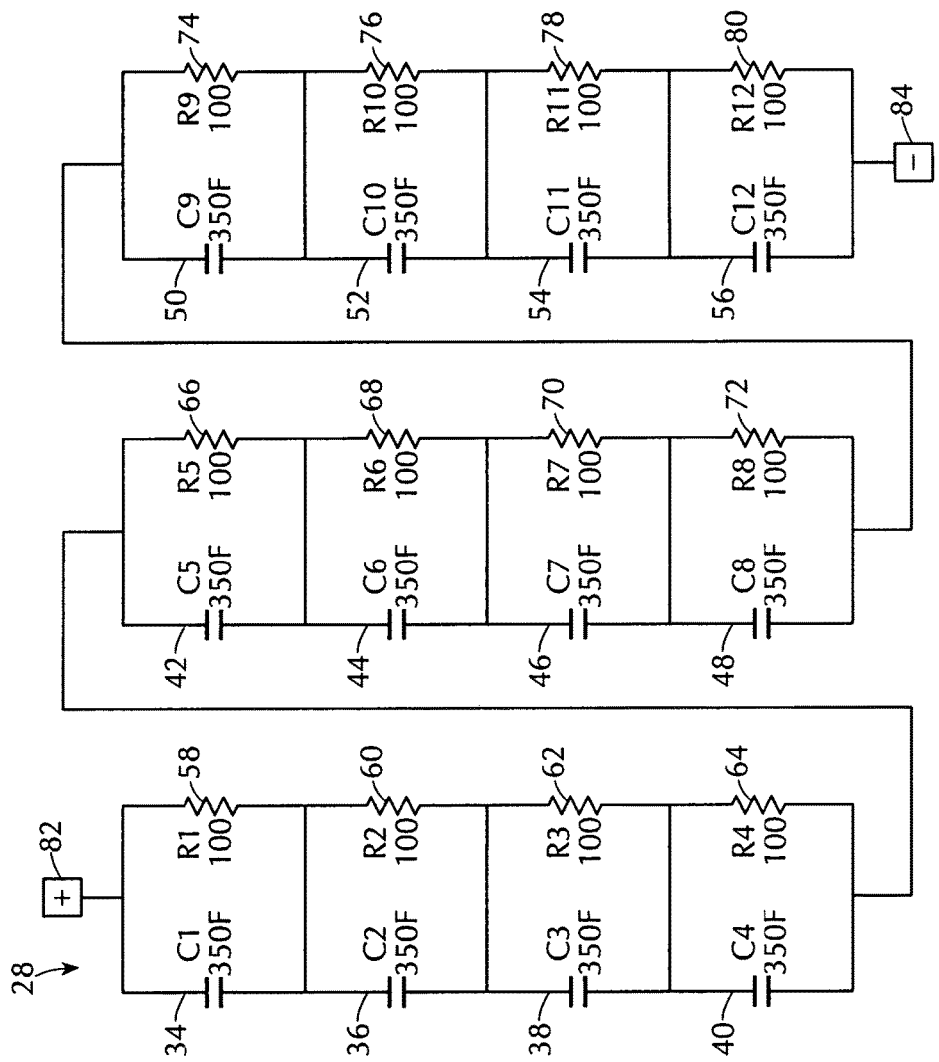
FIG. 2 is a diagrammatic circuit schematic of the bank of supercapacitors of the capacitive-based system of the embodiments of the present invention identified by ARROW 2 in FIG. 1.

The specific configuration of the bank of supercapacitors 28 can best be seen in FIG. 2, which is a diagrammatic circuit schematic of the bank of supercapacitors of the capacitive-based system of the embodiments of the present invention identified by ARROW 2 in FIG. 1, and as such, will be discussed with reference thereto.

The bank of supercapacitors 28—in addition to the plurality of supercapacitors 18 that include supercapacitors C1-C12 34, 36, 38, 40, 42, 44, 46, 48, 50, 52, 54, and 56—comprises a plurality of resistors R1-R12 58, 60, 62, 64, 66, 68, 70, 72, 74, 76, 78, and 80, a positive terminal 82, and a negative terminal 84.

Each of the supercapacitors C1-C12 34, 36, 38, 40, 42, 44, 46, 48, 50, 52, 54, and 56 of the plurality of supercapacitors 18 is a 350 F, 2.7 VDC electric double-layer capacitor.

Each of the supercapacitors C1-C12 34, 36, 38, 40, 42, 44, 46, 48, 50, 52, 54, and 56 of the plurality of supercapacitors 18 is polarized so as to have a positive terminal and a negative terminal that must be respected when connected together.

The supercapacitors C1-C12 34, 36, 38, 40, 42, 44, 46, 48, 50, 52, 54, and 56 of the plurality of supercapacitors 18 are connected in series to form the bank of supercapacitors 28, with the positive terminal of the supercapacitor C1 34 of the plurality of supercapacitors 18 connected to the positive terminal 82, with the negative terminal of supercapacitor C12 56 of the plurality of supercapacitors 18 connected to the negative terminal 84.

Each of the plurality of resistors R1-R12 58, 60, 62, 64, 66, 68, 70, 72, 74, 76, 78, and 80 is a 100 ohm, ⅛ watt resistor.

Each of the plurality of resistors R1-R12 58, 60, 62, 64, 66, 68, 70, 72, 74, 76, 78, and 80 is connected in parallel with a corresponding supercapacitor C1-C12 34, 36, 38, 40, 42, 44, 46, 48, 50, 52, 54, or 56 of the plurality of supercapacitors 18 so that the supercapacitor C1 34 of the plurality of supercapacitors 18 is in parallel with the resistor R1 58, the supercapacitor C2 36 of the plurality of supercapacitors 18 is in parallel with the resistor R2 60, and so on.

The plurality of resistors R1-R12 58, 60, 62, 64, 66, 68, 70, 72, 74, 76, 78, and 80 provide passive load balancing so that over time differences in voltage potential across each of the supercapacitors C1-C12 34, 36, 38, 40, 42, 44, 46, 48, 50, 52, 54, and 56 of the plurality of supercapacitors 18 are equalized.

The bank of supercapacitors 28 has a maximum voltage potential of 32.4 VDC across the positive terminal 82 and the negative terminal 84.

(3) Specific Configuration of the Output Power Supply 20.

The specific configuration of the output power supply 20 can best be seen in FIG. 1, which is, again, a diagrammatic block diagram of the capacitive-based system of the embodiments of the present invention providing an electrical backup power source to an electric actuator for fail-safe actuation, and as such, will be discussed with reference thereto.

The output power supply 20 is a commercial-off-the-shelf (COTS) device.

The output power supply 20 is a DC to DC converter having an input that is connected to the output of the input power supply 16 and to the bank of supercapacitors 28.

When the AC or DC primary power 24 is unavailable, the output power supply 20 boosts the bank voltage 30 of the bank of supercapacitors 28 to a higher DC voltage, namely, the electrical backup power source 12.

The output power supply 20 has an input voltage range from 10 VDC to 36 VDC and an output voltage of 48 VDC.

(4) Specific Configuration of the Plurality of Electromechanical Relays 22.

Figure 3:
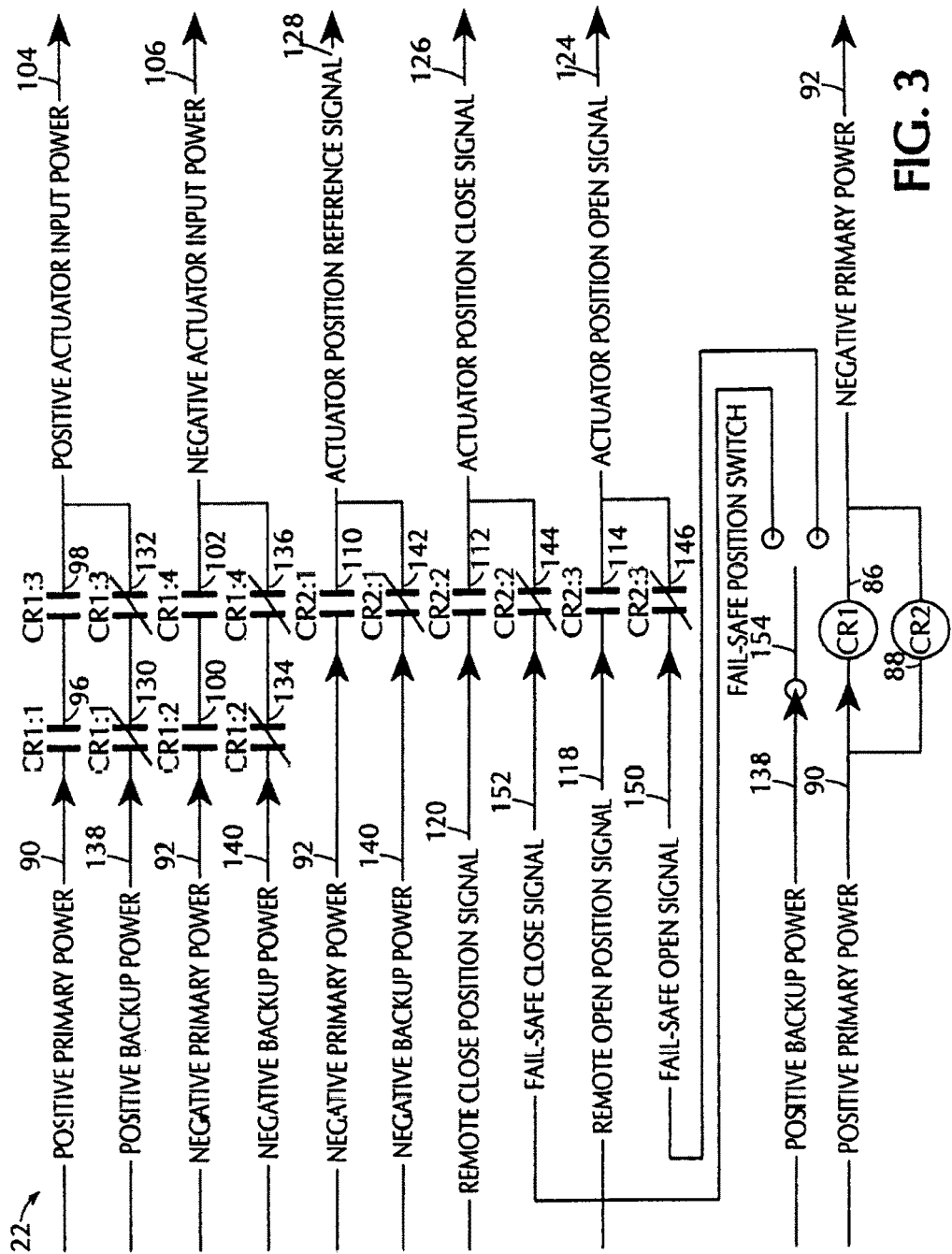
FIG. 3 is a diagrammatic circuit schematic of the electromechanical relays of the capacitive-based system of the embodiments of the present invention identified by ARROW 3 in FIG. 1.

The specific configuration of the plurality of electromechanical relays 22 can best be seen in FIG. 3, which is a diagrammatic circuit schematic of the electro-mechanical relays of the capacitive-based system of the embodiments of the present invention identified by ARROW 3 in FIG. 1, and as such, will be discussed with reference thereto.

The AC or DC primary power 24 and the electrical backup power source 12 are connected to the plurality of electromechanical relays 22 having an output that is connected to, and is the input supply 15 of, the electric actuator 14.

The plurality of electromechanical relays 22 include two four pole relays, with a rated coil voltage selected to match a voltage level supplied by the AC or DC primary power 24.

A first relay 86 of the plurality of electromechanical relays 22 selects which power source, either the AC or DC primary power 24 or the electrical backup power source 12, is applied to the electric actuator 14, while a second relay 88 of the plurality of electromechanical relays 22 selects which positioning signals are applied to the electric actuator 14.

When the first relay 86 of the plurality of electromechanical relays 22 is energized by the application of a positive primary power 90 and a negative primary power 92 across the first relay 86 of the plurality of electromechanical relays 22, normally-open contacts 96, 98, 100, and 102 are connected and conduct the positive primary power 90 and the negative primary power 92 to a positive input power 104 of the electric actuator 14 and a negative input power 106 of the electric actuator 14, respectively.

When the second relay 88 of the plurality of electromechanical relays 22 is energized by the application of the positive primary power 90 and the negative primary power 92 across said second relay 88 of the plurality of electromechanical relays 22, normally-open contacts 110, 112, and 114 are connected and conduct a remote open position signal 118 and a remote close position signal 120, as well as a signal reference, to a position open signal 124 of the electric actuator 14, a position close signal 126 of the electric actuator 14, and a position reference signal 128 of the electric actuator 14, respectively.

When the first relay 86 of the plurality of electromechanical relays 22 is not energized, normally-closed contacts 130, 132, 134, and 136 are connected and conduct a positive backup power 138 and a negative backup power 140 to the positive input power 104 of the electric actuator 14 and the negative input power 106 of the electric actuator 14, respectively.

When the second relay 88 of the plurality of electromechanical relays 22 is not energized, normally-closed contacts 142, 144, and 146 are connected and conduct a fail-safe open signal 150 and a fail-safe close signal 152, as well as the signal reference, to the position open signal 124 of the electric actuator 14, the position close signal 126 of the electric actuator 14, and the position reference signal 128 of the electric actuator 14, respectively.

A fail-safe position is determined by a single pole double throw fail-safe position switch 154 that selectively applies the positive backup power 138 to either the fail-safe open signal 150 or the fail-safe close signal 152.

C. Synopsis of the Capacitive-Based System 10.

The capacitive-based system of the embodiments of the present invention stores and supplies backup electrical power via electric double-layer capacitors, namely, supercapacitors, to an electric actuator during loss of a primary power source. In many applications, it is desirable to electrically operate the electric actuator to a fail-safe position on the loss of the primary power. When an AC or DC primary power is applied to the capacitive based system, relays pass power through to the electric actuator while also energizing a circuit to charge a plurality of supercapacitors to a set voltage level. When the primary power is lost, the relays switch the power supply of the electric actuator to the supercapacitors and command the electric actuator to a fail-safe position.

The advantages of the capacitive-based system include, without limitation, the use of the supercapacitors as the energy-storing media. The supercapacitors have a superior temperature range, a lower maintenance, an improved safety, a smaller size, a longer life span, and a higher output power as compared to batter-based devices making them a solution for providing electrical backup power to electric actuators. Additionally, supercapacitors offer a two or three orders of magnitude increase in capacitance over conventional electrolytic capacitors, which translates in to a superior energy storage at safer voltage levels when compared to other capacitive-based devices.

The capacitive-based system is compact, light-weight, adaptable for multiple primary and backup voltages, and modular to allow for additional banks of supercapacitors, thus increasing available power and electric actuator runtime.

D. Impressions.

It will be understood that each of the elements described above or two or more together may also find a useful application in other types of constructions differing from the types described above.

While the embodiments of the present invention have been illustrated and described as embodied in a capacitive-based system for providing an electrical backup power source for an electric actuator for fail-safe actuation, nevertheless, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A capacitive-based system for providing an electrical backup power source for an electric actuator for fail-safe actuation, wherein the electric actuator has an input supply, said capacitive-based system comprising:

a) a plurality of electromechanical relays
b) a primary DC or AC power source connected to an input of said electromechanical relays
c) an input power supply and an output power supply; and
b) a plurality of supercapacitors; and
d) wherein said input power supply is converting an AC or DC power from the primary power source to a Regulated DC output;
   wherein said plurality of supercapacitors are connected in series to form a bank of supercapacitors;
   wherein said bank of supercapacitors are operatively connected to an output of said input power supply;
   wherein said bank of supercapacitors are charged to a bank voltage set by said regulated DC output of said input power supply;
   wherein said bank of supercapacitors are used to store said electrical backup power source;
   wherein said output power supply is operatively connected to said bank of supercapacitors;
   wherein said output power supply boosts said bank voltage of said bank of supercapacitors to a higher DC output voltage; and
   wherein said higher DC output voltage is connected to a second input of said electromechanical relays;
   wherein said plurality of electromechanical relays are used to switch an input power to the electric actuator between the primary power and the electrical backup power;
   wherein said plurality of electromechanical relays comprise two four pole relays;
   wherein the first four pole relay selects which power source is applied to the electric actuator, and the second four pole relay selects which positioning signals are applied to the electric actuator;
   When the first four pole relay is energized by the application of a positive primary power and a negative primary power a set of normally-open contacts are connected and conduct the positive and negative primary power to a positive and a negative input power of the electric actuator respectively;
   When the second four pole relay is energized by the application of the positive and the negative primary power a different set of normally-open contacts are connected and conduct a remote open position signal, a remote close position signal, as well as a signal reference, to a position open signal, a position close signal and a position reference signal of the electric actuator, respectively;
   When the first four pole relay is not energized, a set of normally-closed contacts are connected and conduct a positive backup power and a negative backup power to the positive and the negative input power of the electric actuator, respectively;
   When the second four pole relay is not energized, a different set of normally-closed contacts are connected and conduct a fail-safe open signal and a fail-safe close signal, as well as the signal reference to the position open signal, the position close signal, and the position reference signal of the electric actuator, respectively;
The fail-safe signal is determined by a single pole double throw fail-safe position switch that selectively applies the positive backup power to either the fail-safe open signal or the fail-safe close signal.

2. The capacitive-based system of claim 1, wherein said plurality of electromechanical relays are operatively connected to said output power supply; and wherein said plurality of electromechanical relays switch the input supply of the electric actuator between the AC or DC primary power and said electrical backup power source and senses a loss of the AC or DC primary power to trigger said capacitive-based system to power the electric actuator to a fail-safe position.

3. The capacitive-based system of claim 1, wherein said input power supply is selected based on a type of the AC or DC primary power available to said capacitive-based system.

4. The capacitive-based system of claim 1, wherein said input power supply is an AC to DC converter.

5. The capacitive-based system of claim 1, wherein said input power supply is a DC to DC converter.

6. The capacitive-based system of claim 4, wherein the AC or DC primary power is a single phase 120-240 VAC 50/60 Hz input.

7. The capacitive-based system of claim 5, wherein the AC or DC primary power is a 24 VDC input.

8. The capacitive-based system of claim 6, wherein said AC to DC converter of said input power supply has an input voltage range; and
wherein said input voltage range of said AC to DC converter of said input power supply is wide enough to span an expected voltage range available from the AC or DC primary power when the AC or DC primary power is a single phase 120-240 VAC 50/60 Hz input.

9. The capacitive-based system of claim 7, wherein said DC to DC converter of said input power supply has an input voltage range; and
wherein said input voltage range of said DC to DC converter of said input power supply is wide enough to span an expected voltage range available from the AC or DC primary power when the AC or DC primary power is a 24 VDC input.

10. The capacitive-based system of claim 1, wherein said bank voltage of said bank of supercapacitors falls within an input voltage range of said output power supply, but does not exceed a maximum voltage level of said bank of supercapacitors.

11. The capacitive-based system of claim 1, wherein said bank voltage of said bank of supercapacitors is as close as possible to a maximum input voltage of said output power supply without exceeding a maximum voltage level of said bank of supercapacitors.

12. The capacitive-based system of claim 1, wherein said input power supply charges said bank of supercapacitors up to said bank voltage of said bank of supercapacitors when the AC or DC primary power is applied.

13. The capacitive-based system of claim 1, wherein said bank of supercapacitors—in addition to said plurality of supercapacitors—comprises:
a) a plurality of resistors;
b) a positive terminal; and
c) a negative terminal.

14. The capacitive-based system of claim 1, wherein each of said plurality of supercapacitors is a 350 F, 2.7 VDC electric double-layer capacitor.

15. The capacitive-based system of claim 13, wherein each of said plurality of supercapacitors is polarized and so has:
a) a positive terminal; and
b) a negative terminal.

16. The capacitive-based system of claim 15, wherein said positive terminal of a first supercapacitor of said plurality of supercapacitors is connected to said positive terminal of said bank of supercapacitors; and
wherein said negative terminal of a last supercapacitor of said plurality of supercapacitors is connected to said negative terminal of said bank of supercapacitors.

17. The capacitive-based system of claim 13, wherein each of said plurality of resistors is a 100 ohm, ⅛ watt resister.

18. The capacitive-based system of claim 13, wherein each of said plurality of resistors is connected in parallel with a corresponding supercapacitor of said plurality of supercapacitors.

19. The capacitive-based system of claim 13, wherein said plurality of resistors provide passive load balancing so overtime, differences in a voltage potential across each supercapacitor of said plurality of supercapacitors are equalized.

20. The capacitive-based system of claim 13, wherein said bank of supercapacitors has a maximum voltage potential of 32.4 VDC across said positive terminal of said bank of supercapacitors and said negative terminal of said bank of supercapacitors.

21. The capacitive-based system of claim 1, wherein said output power supply is a DC to DC converter;
wherein said DC to DC converter of said output power supply has an input; and
wherein said input of said DC to DC converter of said output power supply is connected to an output of said input power supply and said bank of supercapacitors.

22. The capacitive-based system of claim 1, wherein said output power supply boosts said bank voltage of said bank of supercapacitors to said higher DC output voltage/said electrical backup power source when the AC or DC primary power is unavailable.

23. The capacitive-based system of claim 1, wherein said output power supply has an input voltage range from 10 VDC to 36 VDC and an output voltage of 48 VDC.

24. The capacitive-based system of claim 1, wherein the AC or DC primary power and said electrical backup power source are connected to said plurality of electromechanical relays;
wherein said plurality of electromechanical relays have an output;
wherein said output of said plurality of electromechanical relays is connected to the electric actuator; and
wherein said output of said plurality of electromechanical relays is the input supply of the electric actuator.

25. The capacitive-based system of claim 2, wherein a first relay of said plurality of electromechanical relays selects which power source, either the AC or DC primary power or said electrical backup power source, is applied to the electric actuator.

26. The capacitive-based system of claim 25, wherein a second relay of said plurality of electromechanical relays selects which positioning signals are applied to the electric actuator.

27. The capacitive-based system of claim 26, wherein when said first relay of said plurality of electromechanical relays is energized by application of the positive primary power and the negative primary power across said first relay, first normally-open contacts are connected and conduct a positive primary power and a negative primary power to a positive input power of the electric actuator and a negative input power of the electric actuator, respectively.

28. The capacitive-based system of claim 27, wherein when said second relay of said plurality of electromechanical relays is energized by application of the positive primary power and the negative primary power across said second relay, second normally-open contacts are connected and conduct a remote open position signal and a remote close position signal, as well as a signal reference, to a position open signal of the electric actuator, a position close signal of the electric actuator, and a position reference signal of the electric actuator, respectively.

29. The capacitive-based system of claim 28, wherein when said first relay of said plurality of electromechanical relays is not energized, first normally-closed contacts are connected and conduct a positive backup power and a negative backup power to the positive input power of the electric actuator and the negative input power of the electric actuator, respectively.

30. The capacitive-based system of claim 29, wherein when said second relay of said plurality of electromechanical relays is not energized, second normally-closed contacts are connected and conduct a fail-safe open signal and a fail-safe close signal, as well as said signal reference, to the position open signal of the electric actuator, the position close signal of the electric actuator, and the position reference signal of the electric actuator, respectively.

31. The capacitive-based system of claim 30, wherein said fail-safe position is determined by a single pole double throw fail-safe position switch that selectively applies said positive backup power to either said fail-safe open signal or said fail-safe close signal.

* * * * *